(Model.)

A. R. BAILEY & J. B. GLASS.
Packing for Piston Rods.

No. 230,220.  Patented July 20, 1880.

WITNESSES:
Chas. Nice
C. Sedgwick

INVENTOR:
A. R. Bailey
J. B. Glass
BY Munn & Co
ATTORNEYS.

UNITED STATES PATENT OFFICE.

ALVIN R. BAILEY AND JAMES B. GLASS, OF EAST SOMERVILLE, MASS.

PACKING FOR PISTON-RODS.

SPECIFICATION forming part of Letters Patent No. 230,220, dated July 20, 1880.

Application filed May 3, 1880. (Model.)

*To all whom it may concern:*

Be it known that we, ALVIN RICHARDS BAILEY and JAMES BELL GLASS, of East Somerville, in the county of Middlesex and State of Massachusetts, have invented a new and Improved Packing for Piston-Rods and other uses, of which the following is a specification.

Figure 1:
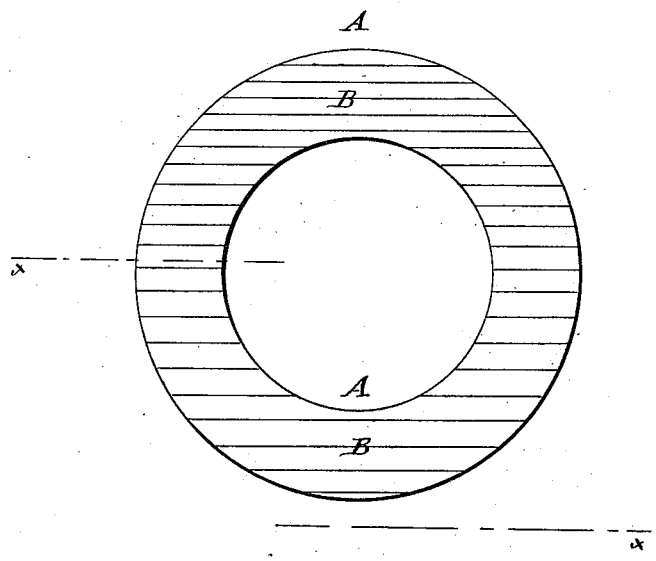
Figure 2:
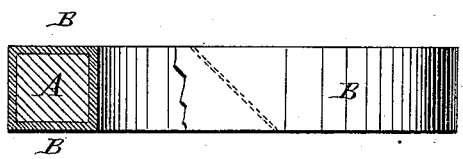

Figure 1 is a plan view of the improvement. Fig. 2 is a sectional elevation taken through the line $x\,x$, Fig. 1.

The object of this invention is to furnish a packing for the piston-rods of pumps, and of compressors for compressing air or chemical gases for refrigerators and ice-making, and for other uses, so constructed that it will not lose its pliability and usefulness from long use, and which will require only a light pressure to keep it tight, so that the piston-rod will work free and cool.

The invention consists in constructing a piston-rod packing of vulcanized rubber, having a coating of plumbago applied to it to preserve the rubber from being injured by use, as will be hereinafter fully described.

A represents the packing, formed of vulcanized rubber, provided with a coating, B, of plumbago vulcanized into the rubber, as shown in Fig. 2.

If desired, the plumbago B may be applied outwardly to the rubber; but we prefer the first-mentioned construction as better protecting the rubber.

The packing A B can be made in rings, as shown in Figs. 1 and 2, or in strips or sheets of any desired shape.

This packing is designed to be used in connection with other kinds of packing placed in the stuffing-box, and may be placed at either end of the stuffing-box or in its middle part, with other packing above and below it, not over two of the packing-rings A B being used in the same stuffing-box.

With this packing the piston-rod will work perfectly tight, even when the packing is quite loose, so that the piston-rod will work easy and cool.

We are aware that it is not new to make a packing of a core of rubber wrapped with flexible material coated with a solution of rubber, or of powdered plumbago and soapstone, or of vulcanized rubber, earth, oxides, and metallic filings, or of rubber surrounded by one or more layers of flexible material, or of a rubber rope coiled and vulcanized; but

What we claim as new and of our invention is—

A piston-rod packing which consists of a rubber ring and a thin coating of plumbago, the latter vulcanized into the external surface of the former, as and for the purpose specified.

ALVIN RICHARDS BAILEY.
JAMES BELL GLASS.

Witnesses:
SAMUEL T. SNOW,
GEORGE BRENNAN.